United States Patent
Miao et al.

(10) Patent No.: US 12,532,188 B2
(45) Date of Patent: Jan. 20, 2026

(54) COMMUNICATION METHOD AND APPARATUS FOR SATELLITE COMMUNICATION SYSTEM, DEVICE, AND READABLE STORAGE MEDIUM

(71) Applicant: DATANG MOBILE COMMUNICATIONS EQUIPMENT CO., LTD., Beijing (CN)

(72) Inventors: Deshan Miao, Beijing (CN); Shaoli Kang, Beijing (CN); Shaohui Sun, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 377 days.

(21) Appl. No.: 18/042,887

(22) PCT Filed: Sep. 8, 2021

(86) PCT No.: PCT/CN2021/117154
§ 371 (c)(1),
(2) Date: Feb. 24, 2023

(87) PCT Pub. No.: WO2022/057699
PCT Pub. Date: Mar. 24, 2022

(65) Prior Publication Data
US 2023/0239708 A1 Jul. 27, 2023

(30) Foreign Application Priority Data
Sep. 16, 2020 (CN) .......................... 202010974440.2

(51) Int. Cl.
*H04W 16/18* (2009.01)
*H04B 7/185* (2006.01)
(Continued)

(52) U.S. Cl.
CPC ........ *H04W 16/28* (2013.01); *H04B 7/18582* (2013.01); *H04L 5/0026* (2013.01)

(58) Field of Classification Search
CPC ................. H04W 16/28; H04W 72/51; H04W 52/0216; H04W 48/18; H04W 52/0254;
(Continued)

(56) References Cited

U.S. PATENT DOCUMENTS

2015/0365939 A1    12/2015  Zhang et al.
2016/0381539 A1*   12/2016  Park ..................... H04W 76/50
                                                       455/404.2
(Continued)

FOREIGN PATENT DOCUMENTS

CN    107046703 A    8/2017
CN    109600158 A    4/2019
(Continued)

OTHER PUBLICATIONS

International Search Report and Written Opinion issued Nov. 26, 2021 in International Application No. PCT/CN2021/117154.
(Continued)

*Primary Examiner* — Afshawn M Towfighi
(74) *Attorney, Agent, or Firm* — Harness, Dickey & Pierce, P.L.C.

(57) ABSTRACT

This disclosure provides a communication method and apparatus for a satellite communication system, a device, and a readable storage medium. The method includes: transmitting an access request signal to a network side device through an uplink beam; and performing an access and data communication process through a service beam, the service beam being scheduled by the network side device after the access request signal is detected by the network side device.

15 Claims, 5 Drawing Sheets

---

101: transmitting an access request signal to a network side device through an uplink beam 102: performing an access and data communication process through a service beam, the service beam being scheduled by the network side device after the access request signal is detected by the network side device (51) Int. Cl.
*H04L 5/00* (2006.01)
*H04W 16/28* (2009.01)

(58) Field of Classification Search
CPC ......... H04W 56/0015; H04W 56/0045; H04W 72/046; H04W 84/06; H04B 7/18582; H04B 7/0695; H04B 7/088; H04B 7/18513; H04L 5/0026; Y02D 30/70
See application file for complete search history.

(56) References Cited

U.S. PATENT DOCUMENTS

| | | |
|---|---|---|
| 2017/0223735 A1 | 8/2017 | Damnjanovic et al. |
| 2017/0359117 A1 | 12/2017 | Ye |
| 2018/0191422 A1* | 7/2018 | Xia ................ H04B 7/061 |
| 2020/0178278 A1* | 6/2020 | Zhao ............... H04W 72/1268 |
| 2020/0281001 A1 | 9/2020 | Zuo et al. |
| 2021/0410198 A1 | 12/2021 | Qiao et al. |
| 2025/0142629 A1* | 5/2025 | Rastegardoost ...... H04L 5/0048 |

FOREIGN PATENT DOCUMENTS

| | | |
|---|---|---|
| CN | 109818723 A | 5/2019 |
| CN | 110838862 A | 2/2020 |
| CN | 111182658 A | 5/2020 |
| WO | 2020/031120 A2 | 2/2020 |

OTHER PUBLICATIONS

First Office Action issued Nov. 23, 2022 in Chinese Application No. 202010974440.2.
Extended European Search Report issued Feb. 2, 2024 in European Application No. 21868524.6.
Mediatek Inc., "Timing relationship enhancements for NR-NTN," 3GPP TSG RAN WG1 Meeting #102e, R1-2005495, Aug. 7, 2020.

* cited by examiner

COMMUNICATION METHOD AND APPARATUS FOR SATELLITE COMMUNICATION SYSTEM, DEVICE, AND READABLE STORAGE MEDIUM

CROSS-REFERENCE TO RELATED APPLICATIONS

This application is a U.S. national phase application of a PCT Application No. PCT/CN2021/117154 filed on Sep. 8, 2021, which claims a priority to the Chinese patent application No. 202010974440.2 filed in China on Sep. 16, 2020, the disclosures of which are incorporated herein by reference in their entireties.

TECHNICAL FIELD

The present disclosure relates to the field of communication technology, in particular to a communication method and apparatus for a satellite communication system, a device, and a readable storage medium.

BACKGROUND

In recent years, combination of satellite communication and ground mobile communication has become an important trend of technology. Satellite communication systems may adopt satellite-based base stations or establish communication links by means of ground gateway stations, so as to support wide coverage. In conventional satellite communication, there are many operation modes of satellite beam, which include: fixed beam, i.e., the direction of the beam is fixed, but the beam moves with the movement of the satellite, so as to form continuous coverage on the ground; and beam hopping, in which the direction of the beam may be changed dynamically, and the beam can cover different geographical locations as needed. Based on the above two beam operation modes, it is able to further design system schemes, e.g., a control beam is fixed, and a service beam adopts beam hopping.

Due to limitations on power consumption and size of satellites, large-capacity communication subjects to significant constraints. The traditional control beam needs to maintain coverage continuously in time, and needs to maintain a certain signal-to-noise ratio to support user access, so the power consumption of the satellite control beam must be kept at a certain level. Under the condition that the total power consumption of the satellite is limited, excessive power consumption of the control beam would inevitably impact the communication service processing of the service beam.

In the related art, the control beam has a large coverage area, while the service beam has a small coverage area, and the service beam may not provide data communication services timely and reliably after the control beam is deactivated. Therefore, a new solution is urgently needed to achieve effective beam management and terminal access, so as to not only reduce the power consumption of satellites, but also provide timely and effective services for the terminal.

SUMMARY

The present disclosure provides a communication method and apparatus for a satellite communication system, a device, and a readable storage medium, so as to solve the problem of how to provide data communication services after a control beam is deactivated.

In one aspect, the present disclosure provides a communication method for a satellite communication system, performed by a terminal, including: transmitting an access request signal to a network side device through an uplink beam; and performing an access and data communication process through a service beam, the service beam being scheduled by the network side device after the access request signal is detected by the network side device.

In a possible embodiment of the present disclosure, the method further includes: obtaining configuration information of the uplink beam, the configuration information being notified by the network side device or specified in a protocol; and determining a signal format, a transmitting frequency and/or a transmitting time of the access request signal in accordance with the configuration information.

In a possible embodiment of the present disclosure, the method further includes: determining a frame boundary or a slot boundary based on a global navigation satellite system time, and achieving time synchronization between the terminal and the network side device through uplink timing pre-compensation; and/or performing Doppler frequency estimation and frequency compensation in accordance with location information of the terminal and the network side device, as well as ephemeris information.

In a possible embodiment of the present disclosure, the transmitting the access request signal to the network side device through the uplink beam includes: transmitting the access request signal to the network side device through the uplink beam in case that the terminal needs to transmit data; or monitoring periodically for a paging message transmitted by the network side device when the terminal is in an inactive state, and transmitting the access request signal to the network side device through the uplink beam in case that a valid paging message is detected; or transmitting the access request signal to the network side device through the uplink beam when the terminal is in the inactive state and in case that a location of the terminal is changed; or transmitting the access request signal to the network side device through the uplink beam based on a periodic location reporting mechanism when the terminal is in the inactive state.

In a possible embodiment of the present disclosure, the access request signal carries location information and/or beam direction of the terminal.

In a possible embodiment of the present disclosure, there is a mapping relationship between time domain resources or time domain resource sets of the access request signal and location information and/or beam directions of the terminal; and/or there is a mapping relationship between frequency domain resources or frequency domain resource sets of the access request signal and location information and/or beam directions of the terminal; and/or there is a mapping relationship between code domain resources or code domain resource sets of the access request signal and location information and/or beam directions of the terminal.

In a possible embodiment of the present disclosure, the access request signal includes one or more of a physical random access channel, an uplink reference signal, and an uplink data channel In another aspect, the present disclosure provides an access method, performed by a network side device, including: receiving an access request signal transmitted by a terminal through an uplink beam; and scheduling, in case that the access request signal is detected by the network side device, a service beam to perform an access and data communication process with the terminal.

In a possible embodiment of the present disclosure, the method further includes: transmitting configuration information of the uplink beam, the configuration information including a signal format, a transmitting frequency and/or a transmitting time of the access request signal.

In a possible embodiment of the present disclosure, the method further includes: determining a beam direction or a geographical region where the terminal is located in accordance with location information and/or the beam direction of the terminal carried in the access request signal; or determining the beam direction or the geographical region where the terminal is located in accordance with a received signal strength of the access request signal; or determining the beam direction or the geographical region where the terminal is located through performing polling detection of the access request signal based on different beam directions; or determining the beam direction or the geographical region where the terminal is located by performing multistage beam detection on the access request signal; or determining the beam direction or the geographical region where the terminal is located by performing baseband access beam matching detection on the access request signal.

In a possible embodiment of the present disclosure, there is a mapping relationship between time domain resources or time domain resource sets of the access request signal and location information and/or beam directions of the terminal; and/or there is a mapping relationship between frequency domain resources or frequency domain resource sets of the access request signal and location information and/or beam directions of the terminal; and/or there is a mapping relationship between code domain resources or code domain resource sets of the access request signal and location information and/or beam directions of the terminal.

In yet another aspect, the present disclosure provides a communication apparatus for a satellite communication system, applied to a terminal, including: a first transmission module, configured to transmit an access request signal to a network side device through an uplink beam; and a first processing module, configured to perform an access and data communication process through a service beam, the service beam being scheduled by the network side device after the access request signal is detected by the network side device.

In still another aspect, the present disclosure provides a terminal including: a first processor, a first transceiver, and a first memory. The first transceiver is configured to receive and transmit data under the control of the first processor; and the first processor is configured to read a program in the first memory to execute the following operations: transmitting an access request signal to a network side device through an uplink beam; and performing an access and data communication process through a service beam, the service beam being scheduled by the network side device after the access request signal is detected by the network side device.

In still yet another aspect, the present disclosure provides a communication apparatus for a satellite communication system, applied to a network side device, including: a reception module, configured to receive an access request signal transmitted by a terminal through an uplink beam; and a fourth processing module, configured to schedule, in case that the access request signal is detected by the network side device, a service beam to perform an access and data communication process with the terminal.

In still yet another aspect, the present disclosure provides a network side device, including: a second processor, a second transceiver and a second memory. The second transceiver is configured to receive and transmit data under the control of the second processor; and the second processor is configured to read a program in the second memory to execute the following operations: receiving an access request signal transmitted by a terminal through an uplink beam; and scheduling, in case that the access request signal is detected by the network side device, a service beam to perform an access and data communication process with the terminal.

In still yet another aspect, the present disclosure provides a readable storage medium storing a computer program. The computer program is configured to be executed by a processor to implement steps of the above-mentioned method.

According to the embodiments of the present disclosure, it is able to achieve user's access and data communication through the service beam, so as to reduce power consumption of the satellite effectively, and provide user with communication access and data transmission services, thereby breaking through the power consumption bottleneck of the satellite system.

BRIEF DESCRIPTION OF THE DRAWINGS

Through reading the detailed description hereinafter, the other advantages and benefits will be apparent to a person skilled in the art. The drawings are merely used to show preferred implementations, but shall not be construed as limiting the present disclosure. In addition, in the drawings, same reference symbols represent identical members. In these drawings.

DETAILED DESCRIPTION

The present disclosure will be described hereinafter in a clear and thorough manner in conjunction with the drawings and embodiments. Obviously, the following embodiments merely relate to a part of, rather than all of, the embodiments of the present disclosure, and based on these embodiments, a person skilled in the art may, without any creative effort, obtain other embodiments, which also fall within the scope of the present disclosure.

Such words as "comprising" "including" and any variations thereof used in the description and claims are intended to cover a non-exclusive inclusion, e.g., a process, a method, a system, a product, or a device that includes a series of steps or elements is not necessarily limited to the explicitly listed steps or elements, but may include other steps or elements not expressly listed or inherent to such a process, a method, a product or device. Furthermore, such words as "and/or" used in the description and claims means at least one of the connected objects, e.g., A and/or B means three cases: A alone, B alone, and both A and B.

Such expressions as "illustrative" and "for example" are merely used to show examples or explanations. Any illustrative embodiment or scheme in the present disclosure shall not be construed as being more superior or advantageous over other embodiment or scheme. Specifically, these expressions are intended to exhibit relevant concepts in a concrete manner Technical solutions in the embodiments of the present application may be applicable to various systems, especially 5th Generation (5G) systems. For example, a suitable system may be a global system of mobile communication (GSM) system, a code division multiple access (CDMA) system, a wideband code division multiple access (WCDMA) system, a time division synchronous code division multiple access (TD-SCDMA) system, a general packet radio service (GPRS) system, a long term evolution (LTE) system (including TD-LTE and FDD LTE), a long term evolution advanced (LTE-A) system, a universal mobile telecommunication system (UMTS), a worldwide interoperability for microwave access (WiMAX) system, and a 5G New Radio (NR) system. Each of the systems includes a terminal device and a network side device. The systems may further include a core network portion, such as an evolved packet system (EPS), and a 5G system (5GS/5GC).

Figure 1:
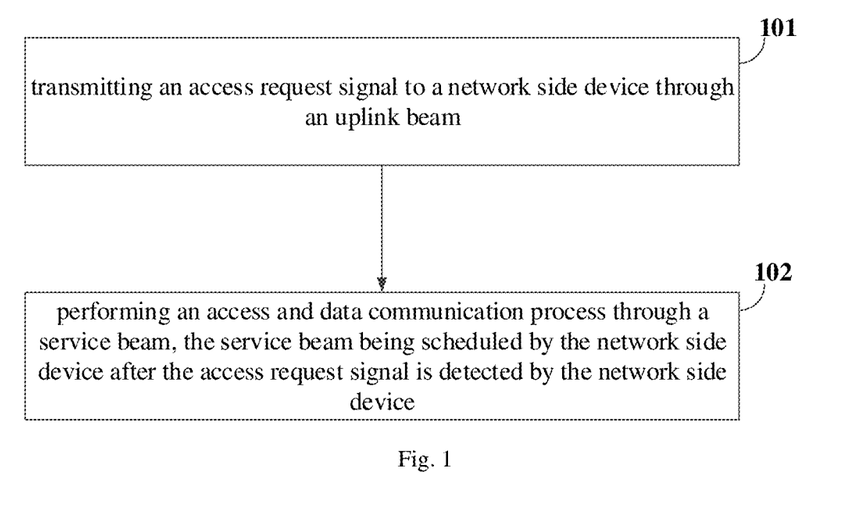
FIG. 1 is a flow chart of a communication method for a satellite communication system according to an embodiment of the present disclosure.

As shown in FIG. 1, the present disclosure provides in some embodiments a communication method for a satellite communication system, the method may be performed by a terminal, and the method includes Step 101 and Step 102.

Step 101: transmitting an access request signal to a network side device through an uplink beam.

It should be appreciated that, the network side device may be a base station arranged on an airborne vehicle, e.g., a satellite-based base station; or may be a base station arranged on the ground, i.e., a ground base station. Signals transmitted by the terminal reach the satellite firstly, and then are forwarded to the ground base station by a signal processing device of the satellite.

Step 102: performing an access and data communication process through a service beam, the service beam being scheduled by the network side device after the access request signal is detected by the network side device.

In the embodiments of the present disclosure, the method may further include: obtaining configuration information of the uplink beam, the configuration information being notified by the network side device or specified in a protocol; and determining a signal format, a transmitting frequency and/or a transmitting time of the access request signal in accordance with the configuration information.

In the embodiments of the present disclosure, the signal format of the access request signal is directly related to employed physical channel and signal type. Different signal types may assume different respective signal formats. A transmitting frequency of the access request signal mainly refers to a carrier frequency of the transmission signal, if the transmission signal has multiple candidate transmission sub-bands in one frequency band, then the transmitting frequency information also includes sub-band frequency indication information, and frequency resource information corresponding to the transmitting frequency. Transmitting time refers to information about transmitting time window of the access request signal, which corresponds specifically to a certain time moment or a period of time.

In the embodiments of the present disclosure, a frame boundary or a slot boundary is determined based on a global navigation satellite system (GNSS) time, and both the terminal and the network side device designate the same time point as the starting time of a signal frame, so as to ensure that the terminal is synchronous with the network side device in terms of the time window for transmitting the access request signal. The satellite is far away from the ground terminal, the resultant uplink timing offset may be compensated through uplink timing pre-compensation technology, so as to achieve time synchronization with the network side device; and/or Doppler frequency estimation and frequency compensation are performed in accordance with location information of the terminal and the network side device, as well as ephemeris information.

In the embodiments of the present disclosure, transmitting uplink access request to the network side device through the uplink beam includes any one of following modes: Mode 1, transmitting the access request signal to the network side device through the uplink beam if the terminal needs to transmit data; Mode 2, monitoring periodically for a paging message transmitted by the network side device when the terminal is in an inactive state, and transmitting the access request signal to the network side device through the uplink beam in case that a valid paging message is detected; Mode 3, when the terminal is in the inactive state, transmitting the access request signal to the network side device through the uplink beam if a location of the terminal is changed; Mode 4, transmitting the access request signal to the network side device through the uplink beam based on a periodic location reporting mechanism when the terminal is in the inactive state.

In the embodiments of the present disclosure, the access request signal carries location information and/or beam direction of the terminal.

In the embodiments of the present disclosure, there is a mapping relationship between time domain resources or time domain resource sets of the access request signal and location information and/or beam directions of the terminal; and/or there is a mapping relationship between frequency domain resources or frequency domain resource sets of the access request signal and location information and/or beam directions of the terminal; and/or there is a mapping relationship between code domain resources or code domain resource sets of the access request signal and location information and/or beam directions of the terminal.

In the embodiments of the present disclosure, the access request signal includes one or more of a physical random access channel (PRACH), an uplink reference signal, and an uplink data channel.

Furthermore, the access request signal may carry location information of the terminal, for example, the access request signal may be transmitted in multiple stages, where the first stage carries rough location information and subsequent access request signals carry more accurate location information, and the network side device determines the specific location of the terminal through multiple detections.

According to the embodiments of the present disclosure, it is able to achieve user's access and data communication through the service beam, so as to reduce power consumption of the satellite effectively, and provide user with communication access and data transmission services, thereby breaking through the power consumption bottleneck of the satellite system.

In the embodiments of the present disclosure, the uplink beam used for carrying the uplink access request signal assumes a role of enabling the terminal to request access to a network, and the uplink beam may also be referred to as access beam; the service beam is mainly used for the access control and data transmission function of the terminal, and may be transmitted by the network targeting the user location.

Figure 2:
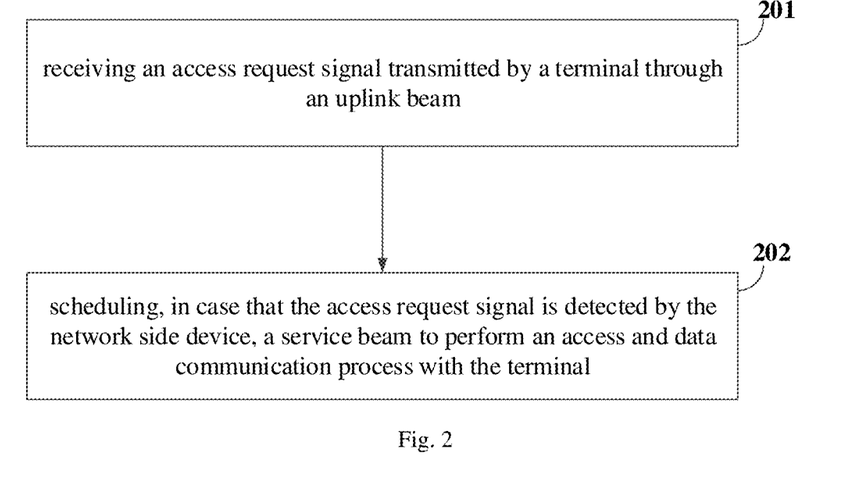
FIG. 2 is another flow chart of a communication method for a satellite communication system according to an embodiment of the present disclosure.

As shown in FIG. 2, the present disclosure provides in some embodiments a communication method for a satellite communication system, the method may be performed by a network side device, e.g., a satellite-based base station, and the method includes Step 201 and Step 202. It should be appreciated that, the network side device may also be a ground base station, i.e., a ground-based satellite communication base station receives and processes the communication signal transmitted by the terminal and forwarded by the satellite.

Step 201: receiving an access request signal transmitted by a terminal through an uplink beam.

Step 202: scheduling, in case that the access request signal is detected by the network side device, a service beam to perform an access and data communication process with the terminal.

In the embodiments of the present disclosure, the method further includes: transmitting configuration information of the uplink beam, and the configuration information including a signal format, a transmitting frequency and/or a transmitting time of the access request signal.

In the embodiments of the present disclosure, a beam direction or a geographical region where the terminal is located is determined through any one of following modes: Mode 1, determining the beam direction or the geographical region where the terminal is located in accordance with location information and/or the beam direction of the terminal carried in the access request signal; Mode 2, determining the beam direction or the geographical region where the terminal is located in accordance with a received signal strength of the access request signal; Mode 3, determining the beam direction or the geographical region where the terminal is located through performing polling detection of the access request signal based on different beam directions; Mode 4, determining the beam direction or the geographical region where the terminal is located by performing multi-stage beam detection on the access request signal, wherein, in order to determine the region where the terminal is located, the network may perform multiple detections, e.g., performing a first detection using a wide beam and then performing a second detection using a narrow beam, so as to determine the beam direction or geographical region where the terminal is located stage by stage; and Mode 5, determining the beam direction or the geographical region where the terminal is located by performing baseband access beam matching detection on the access request signal.

In the embodiments of the present disclosure, there is a mapping relationship between time domain resources or time domain resource sets of the access request signal and location information and/or beam directions of the terminal; and/or there is a mapping relationship between frequency domain resources or frequency domain resource sets of the access request signal and location information and/or beam directions of the terminal; and/or there is a mapping relationship between code domain resources or code domain resource sets of the access request signal and location information and/or beam directions of the terminal.

According to the embodiments of the present disclosure, it is able to achieve user's access and data communication through the service beam, so as to reduce power consumption of the satellite effectively, and provide user with communication access and data transmission services, thereby breaking through the power consumption bottleneck of the satellite system.

Figure 3:
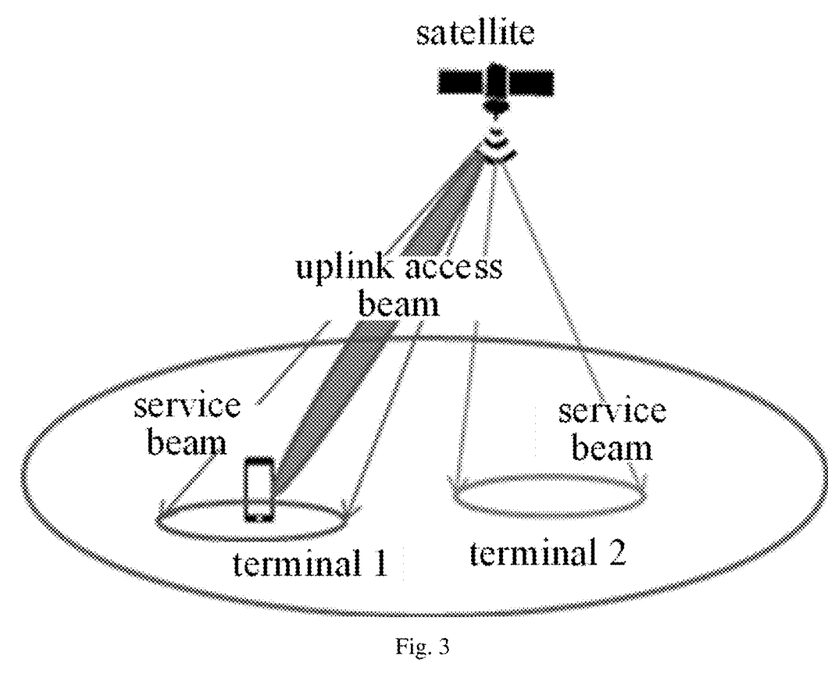
FIG. 3 is a schematic view showing an operation principle of an access beam and a service beam according to an embodiment of the present disclosure.

As shown in FIG. 3, the network includes an uplink beam and a service beam. The uplink beam is used for uplink signal transmission of the terminal. The service beam is used for data communication and is also used for the transmission of paging signals, and further includes an uplink beam and a downlink beam. When the terminal has a data transmission request, the terminal transmits an access request signal through the uplink beam; and after the network detects the access request signal transmitted by the terminal, the network schedules a service beam to serve the terminal, and then a terminal access process is executed to carry out subsequent data communication services.

First Embodiment: definition of operation states of the terminal: an active state and an inactive state In order to support the terminal to transmit the access request signal by using the uplink beam and then gain access to an active status, it is necessary to set at least two operation states of the terminal, namely, the active state and the inactive state.

The active state: when the terminal is in the active state, the terminal performs data communication with the network, maintains synchronization with the network, and maintains communication connection to the network through the service beam of the satellite.

The inactive state: when the terminal is in the inactive state, the terminal is in a standby state, and merely monitors periodically for the paging message, or merely initiates the network access request in case that the geographical location thereof changes.

Figure 4:
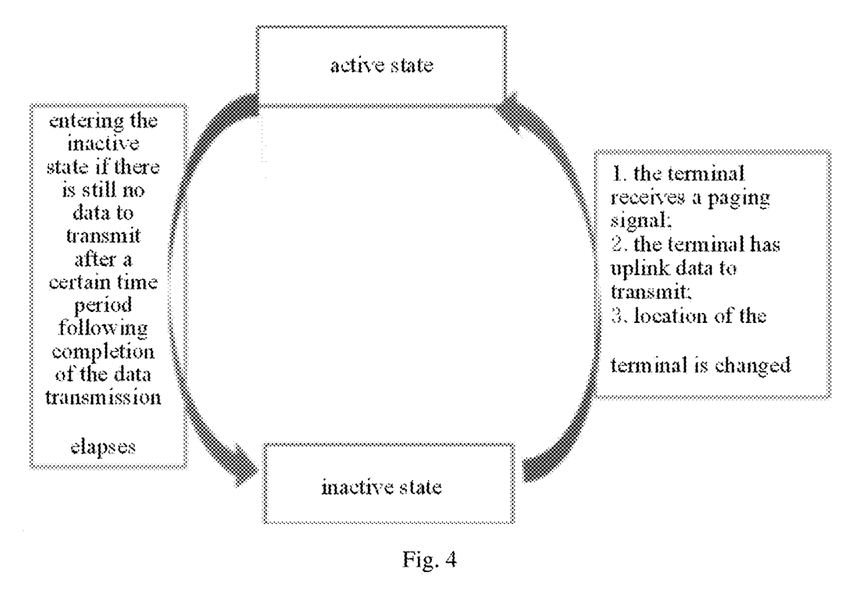
FIG. 4 is a schematic view showing transition between an active state and an inactive state according to an embodiment of the present disclosure.

As shown in FIG. 4, state transitions include:
(1) From active state to inactive state: when the terminal is in the active state, the terminal mainly carries out data transmission; and if the data transmission is completed, the terminal will return to the inactive state.
(2) From inactive state to active state: when there is no data to transmit, the terminal is in the inactive state, and returns to the active state if one of the following three conditions is met: a) the terminal receives a paging message; b) a location of the terminal changes; c) the terminal has uplink data to transmit.

Second Embodiment: design of the access request signal

When a terminal is initially powered on and there is a data message to transmit, the terminal needs to transmit the access request signal firstly; after the network side device detects the access request signal of the terminal, the network side device determines the location of the terminal, and then schedules one service beam to serve the user to complete the access and data communication process.

Types of the access request: because the access request signal is used to notify the network that a user needs to access the network, the uplink PRACH, the uplink reference signal, or the uplink data channel may be used for indication of an uplink access request.

Location indication through the access request signal includes the following modes:

Mode 1: the access request signals are grouped, and messages thereof are distinguished from each other through the time domain, frequency domain, code domain, such that the access request signal carries the location information;

Mode 2: the access request signal does not carry location information; instead, the network determines the location of the terminal through the message processing of a receiving beam.

Figure 5:
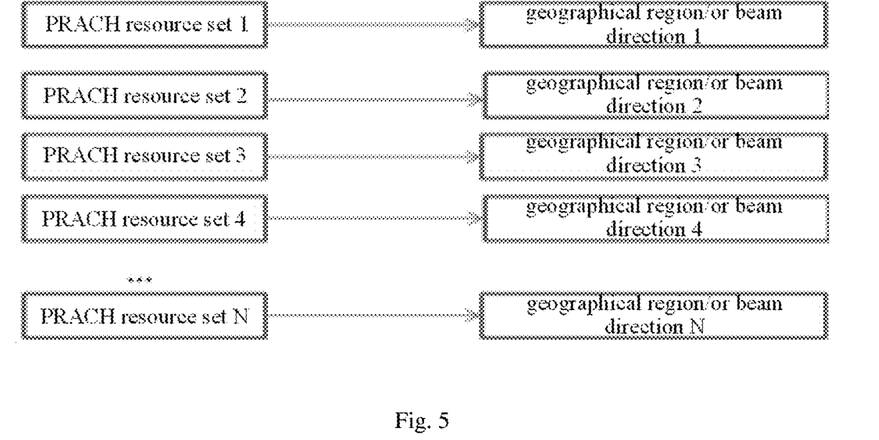
FIG. 5 is a schematic view showing a mapping relationship between PRACH resource sets and geographical regions according to an embodiment of the present disclosure.

When the access request signal is a PRACH, if it is necessary to indicate the location information of the terminal, the location information needs to be labelled firstly, e.g., an absolute indication method utilizing longitude and latitude is used, or a relative location indication method, i.e., relative location information of the terminal with respect to a serving satellite, is used. Next, the PRACH is encoded, where different time domain, frequency domain, code domain information or the like represent different respective geographical locations, and a one-to-one mapping relationship between the PRACH resources and the geographical locations (geographical regions) is established, or more roughly, a one-to-one mapping relationship between the PRACH resources and the beam directions may be established, as shown in FIG. 5.

Furthermore, the access request signal may be transmitted in multiple stages, where the first stage carries rough information and subsequent access request signals carry more accurate location information, and the network determines the specific location of the terminal through multiple detections.

Third Embodiment: synchronization of the access request signal

When the terminal needs to access the network, the terminal needs to transmit an access request signal firstly. At this time, the terminal is not synchronized with the network, so an additional synchronization operation needs to be performed to ensure that the network may receive the message of the terminal. The terminal determines its location based on the GNSS message, to obtain the location information of the terminal.

Time synchronization: the terminal determines an orbital location of the satellite based on the ephemeris information, calculates a distance between the terminal and the satellite based on the orbital location of the satellite and the location of the terminal, and deduces timing synchronization offset information based on the distance; and when the terminal transmits an uplink message, the terminal firstly performs timing compensation, such that time synchronization with the network can be kept when the transmitted message is received at a receiving side of the satellite base station or at the ground station.

When the network and the terminal use the GNSS time as a basis for frame timing, the network and the terminal generate a system frame number index based on an absolute time point, and determine a frame boundary and a slot boundary in accordance with the system frame number, so as to keep frame synchronization. Here, the frame may refer to a radio frame, or may encompass a multilevel frame definition, such as frame and sub-frame.

Frequency synchronization: the terminal determines an orbital location of the satellite based on the ephemeris information, calculates an angle between the terminal and the satellite, and further calculates a Doppler shift value of the satellite; and when the terminal transmits an uplink message, the terminal firstly performs frequency compensation, such that frequency synchronization with the network can be kept when the transmitted message is received at a receiving side of the satellite base station or at the ground station.

When the uplink message is transmitted, the frequency offset between crystal oscillators also exists. It is able to reduce the frequency offset between the terminal and the satellite base station through imposing a stricter constraint on the stability of the crystal oscillators of the terminal and the satellite base station. At the same time, sub-carrier spacing of the uplink transmission of the request message is increased, to cope with the crystal oscillator frequency offset of the uplink message.

Solution for the crystal oscillator frequency offset includes: (1) the carrier frequency of a transmission signal is adjusted based on the frequency of the GNSS; (2) the network broadcasts the crystal oscillator offset of a satellite base station or a gateway station; and (3) the terminal adjusts the frequency of the transmission signal based on historical information about the crystal oscillator offset between the terminal and the network that is notified by the network.

Fourth Embodiment: reception of an access request signal by the network

The network may receive the uplink access request message in following manners.

Manner 1: the network receives the access request signal periodically, and performs polling in different beam directions; when it is determined that the strength of the received message exceeds a certain threshold or the threshold after a detection processing exceeds a certain threshold value, the network may identify the beam where the terminal is located, and further determines the beam direction and geographical region where the terminal is located.

Manner 2: the network receives the access request signal periodically by using an omnidirectional beam, and performs beam matching by using a baseband message; when it is determined that the strength of the received message exceeds a certain threshold or the threshold after a detection processing exceeds a certain threshold value, the network may identify the beam where the terminal is located, and further determines the beam direction and geographical region where the terminal is located.

Manner 3: the network receives the access request signal periodically by using the uplink beam, and after the location information carried in the access request signal transmitted by the terminal is detected by the network, the network determines the geographical region or beam direction where the terminal is located. In order to detect the region where the terminal is located, the network may perform multiple detections, for example, performing a first detection using a wide beam and then performing a second detection using a narrow beam, so as to determine the location area where the terminal is located stage by stage.

Fifth Embodiment: transmission and reception of paging messages

When a terminal is in the inactive state, if other users want to communicate with the terminal, they can transmit paging messages through the network. Because the terminal does not monitor for the network broadcast message in the inactive state, it is impossible to maintain the downlink synchronization of the network. As a result, before receiving the paging message, it is necessary for the terminal to monitor for the synchronization and broadcast message of the network firstly, and then the terminal receives the paging message.

Transmission and reception of paging messages includes following steps: (1) the network schedules, based on the location of the user and a call request of the network, one or more service beams to transmit a synchronization message, a broadcast channel, and a paging channel to the location of the terminal; (2) the terminal in the inactive state wakes up periodically to monitor for the paging message transmitted by the network, and if a paging message is found, the terminal enters the active state to start a network access and communication process, otherwise, the terminal returns to the inactive state; (3) in order to improve the detection success rate of the terminal, the paging message need to be transmitted multiple times; correspondingly, the synchronization message and the broadcast channel may be transmitted multiple times.

In order to reduce the power consumption of the wake-up of the terminal and the unnecessary detection process, the network may transmit a wake-up message before transmitting the paging message. When the wake-up message is detected by the terminal, the terminal determines that new paging information is available; then the terminal continues to monitor for the paging message, and enters a radio resource control (RRC) connection establishment procedure after detecting the paging message.

Sixth Embodiment: reporting of movement of the terminal

When the terminal is in the inactive state, in order to ensure that the network may page accurately, the terminal needs to report the location information to the network periodically, or if a distance between the current location of the terminal and the last location of the terminal exceeds a certain distance threshold, the terminal reports the location information to the network.

When the location information needs to be reported to the network, the terminal needs to transmit an access request signal with the uplink beam; and when the network detects the signal transmitted by the terminal, the network schedules a service beam to serve the user, and then starts the terminal access process.

Due to the small coverage of the service beam, the network must obtain the location information of the user before paging the user. At the same time, in order to reduce the paging resources of the network and the power consumption of the terminal, the network pages the user during specific time windows, and the terminal also monitors for the paging message at a specific time moment. The configuration of a paging periodicity needs to take account of many factors such as response delay of the terminal, network overhead, and power consumption of the terminal. Moreover, because a serious synchronization problem may occur due to the movement of the satellite, the terminal needs to synchronize in advance each time it detects the paging message of the network. Therefore, a reasonable paging periodicity can be set after weighing various factors.

Figure 6:
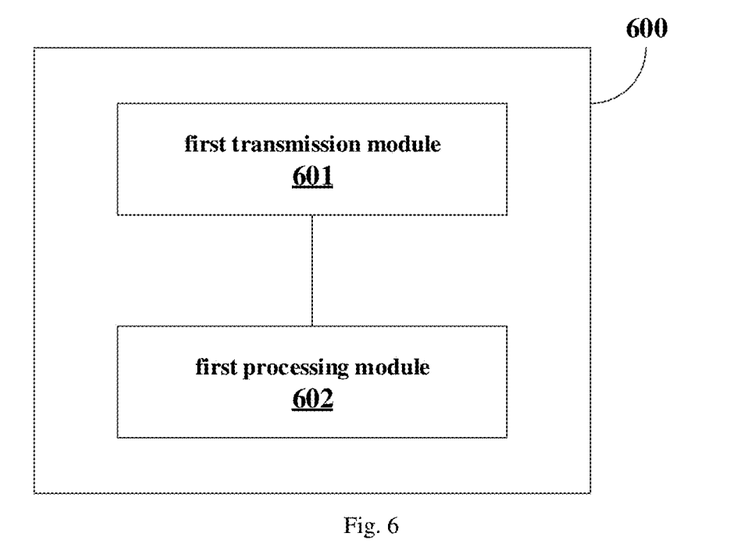
FIG. 6 is a schematic view showing a communication apparatus according to an embodiment of the present disclosure.

As shown in FIG. 6, the present disclosure provides in some embodiments a communication apparatus for a satellite communication system, which is applied to a terminal. The apparatus 600 includes: a first transmission module 601, configured to transmit an access request signal to a network side device through an uplink beam; and a first processing module 602, configured to perform an access and data communication process through a service beam, the service beam being scheduled by the network side device after the access request signal is detected by the network side device.

In an embodiment of the present disclosure, the apparatus 600 further includes: an obtaining module, configured to obtain configuration information of the uplink beam, the configuration information being notified by the network side device or specified in a protocol; and a second processing module, configured to determine a signal format, a transmitting frequency and/or a transmitting time of the access request signal in accordance with the configuration information.

In an embodiment of the present disclosure, the apparatus 600 further includes: a third processing module, configured to: determine a frame boundary or a slot boundary based on a global navigation satellite system time, and achieve time synchronization between the terminal and the network side device through uplink timing pre-compensation; and/or perform Doppler frequency estimation and frequency compensation in accordance with location information of the terminal and the network side device, as well as ephemeris information.

In an embodiment of the present disclosure, the first transmission module 601 is further configured to: transmit the access request signal to the network side device through the uplink beam in case that the terminal needs to transmit data; or monitor periodically for a paging message transmitted by the network side device when the terminal is in an inactive state, and transmit the access request signal to the network side device through the uplink beam in case that a valid paging message is detected; or transmit the access request signal to the network side device through the uplink beam when the terminal is in the inactive state and in case that a location of the terminal is changed; or transmit the access request signal to the network side device through the uplink beam based on a periodic location reporting mechanism when the terminal is in the inactive state.

In an embodiment of the present disclosure, the access request signal carries location information and/or beam direction of the terminal.

In an embodiment of the present disclosure, there is a mapping relationship between time domain resources or time domain resource sets of the access request signal and location information and/or beam directions of the terminal; and/or there is a mapping relationship between frequency domain resources or frequency domain resource sets of the access request signal and location information and/or beam directions of the terminal; and/or there is a mapping relationship between code domain resources or code domain resource sets of the access request signal and location information and/or beam directions of the terminal.

In an embodiment of the present disclosure, the access request signal includes one or more of a physical random access channel, an uplink reference signal, and an uplink data channel.

The communication apparatus according to the embodiments of the present disclosure may implement the method embodiment shown in FIG. 1, and has the same implementation principle and achieves the same beneficial effects, and thus a detailed description thereof will not be repeated herein.

Figure 7:
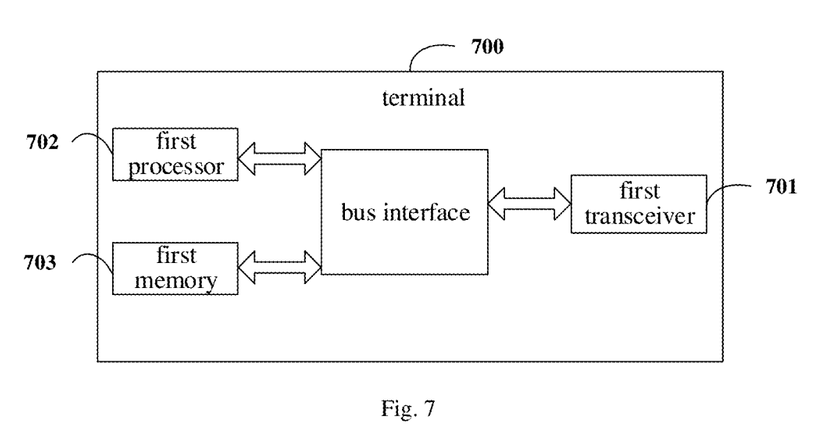
FIG. 7 is a schematic view showing a terminal according to an embodiment of the present disclosure.

As shown in FIG. 7, the present disclosure provides in some embodiments a terminal 700 including: a first transceiver 701, a first processor 702, and a first memory 703. The first transceiver 701 is configured to transmit and receive data under the control of the first processor 702; and the first processor 702 is configured to read a program in the first memory to execute the following operations: transmitting an access request signal to a non-ground base station of a network side device through an uplink access beam; and performing an access and data communication process through a service beam, the service beam being scheduled by the non-ground base station of the network side device after the access request signal is detected.

The terminal according to the embodiments of the present disclosure may implement the method embodiment shown in FIG. 1, and has the same implementation principle and achieves the same beneficial effects, and thus a detailed description thereof will not be repeated herein.

Figure 8:
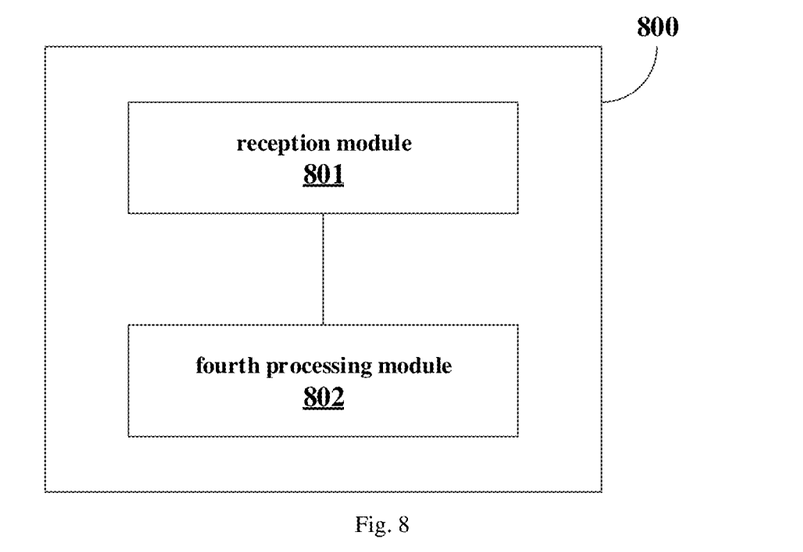
FIG. 8 is another schematic view showing a communication apparatus according to an embodiment of the present disclosure.

As shown in FIG. 8, the present disclosure provides in some embodiments a communication apparatus for a satellite communication system, which is applied to a network side device. The apparatus 800 includes: a reception module 801, configured to receive an access request signal transmitted by a terminal through an uplink beam; and a fourth processing module 802, configured to schedule, in case that the access request signal is detected by the network side device, a service beam to perform an access and data communication process with the terminal.

In an embodiment of the present disclosure, the communication apparatus further includes a second transmission module, configured to transmit configuration information of the uplink beam, the configuration information including a signal format, a transmitting frequency and/or a transmitting time of the access request signal.

In an embodiment of the present disclosure, the communication apparatus further includes a fifth processing module, configured to: determine a beam direction or a geographical region where the terminal is located in accordance with location information and/or the beam direction of the terminal carried in the access request signal; or determine a beam direction or a geographical region where the terminal is located in accordance with a received signal strength of the access request signal; or determine a beam direction or a geographical region where the terminal is located through performing polling detection of the access request signal based on different beam directions; or determine a beam direction or a geographical region where the terminal is located by performing multistage beam detection on the access request signal; or determine a beam direction or a geographical region where the terminal is located by performing baseband access beam matching detection on the access request signal.

In an embodiment of the present disclosure, there is a mapping relationship between time domain resources or time domain resource sets of the access request signal and location information and/or beam directions of the terminal; and/or there is a mapping relationship between frequency domain resources or frequency domain resource sets of the access request signal and location information and/or beam directions of the terminal; and/or there is a mapping relationship between code domain resources or code domain resource sets of the access request signal and location information and/or beam directions of the terminal.

Figure 9:
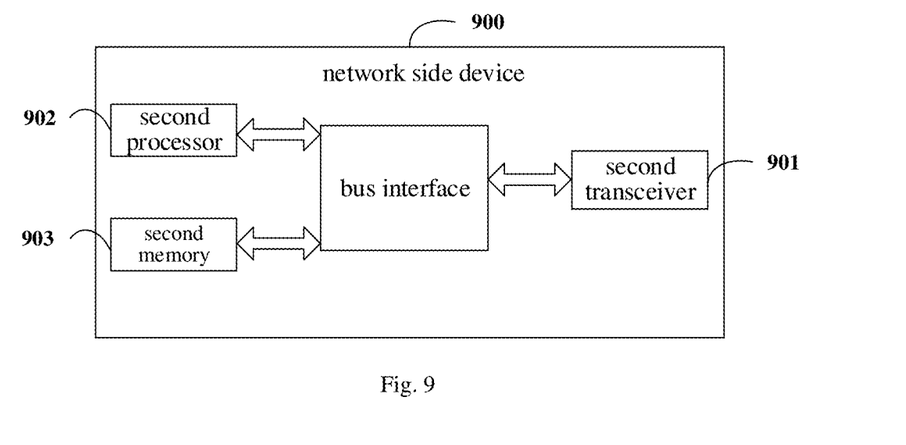
FIG. 9 is a schematic view showing a network side device according to an embodiment of the present disclosure.

As shown in FIG. 9, the present disclosure provides in some embodiments a network side device 900, including: a second transceiver 901, a second processor 902 and a second memory 903. The second transceiver 901 is configured to transmit and receive data under the control of the second processor 902; and the second processor 902 is configured to read a program in the second memory 903 to execute the following operations: receiving an access request signal transmitted by a terminal through an uplink beam; and scheduling, in case that the access request signal is detected by the network side device, a service beam to perform an access and data communication process with the terminal.

The network side device according to the embodiments of the present disclosure may implement the method embodiment shown in FIG. 2, and has the same implementation principle and achieves the same beneficial effects, and thus a detailed description thereof will not be repeated herein.

The present disclosure further provides in some embodiment a readable storage medium storing a program or an instruction. The program or the instruction is configured to be executed by a processor to implement steps in the above-mentioned method embodiment shown in FIG. 1 or FIG. 2. The same beneficial effects can be achieved, thus a detailed description thereof will not be repeated herein.

The steps of the method or algorithm described in the present disclosure may be implemented as hardware or software instructions executed by a processor. The software instructions may be composed of corresponding software modules that may reside in a random access memory (RAM), flash memory, read-only memory (ROM), erasable programmable ROM (EPROM), electrically erasable programmable ROM (EEPROM), register, hard disk, removable hard disk, compact disc read-only memory (CD-ROM), or any other form of storage medium known in the art. For example, a storage medium is coupled to a processor so that the processor may read information from and write information to the storage medium. Of course, the storage medium may also be a part of the processor. The processor and the storage medium may reside in an application specific integrated circuit (ASIC). In addition, the ASIC may reside in a core network interface device. Of course, the processor and the storage medium may also reside, as discrete components, in the core network interface device.

It is readily appreciated by a person skilled in the art that, the functions described in one or more of the above examples of the present disclosure may be implemented in hardware, software, firmware, or any combination thereof. When implemented in software, the functions may be stored in a computer-readable medium or transmitted as one or more instructions or codes in a computer-readable medium. The computer-readable medium includes a computer storage medium and a communication medium, where the communication medium includes any medium that facilitates the transmission of a computer program from one place to another. The storage medium may be any available medium accessible by a general-purpose or special-purpose computer.

In the aforementioned specific implementations, the purpose, technical solutions and beneficial effects of the present disclosure are further described in detail. It should be appreciated that, the above implementations are for illustrative purposes only, and the present disclosure is not limited thereto, and any modification, equivalent replacement or improvement made on the basis of the technical solution of the present disclosure shall also fall within the scope of the present disclosure.

For a person skilled in the art, the embodiments of the present disclosure may be provided as methods, systems, or computer program products. Accordingly, the present disclosure may take the form of an entirely hardware embodiment, an entirely software embodiment or an embodiment combining software and hardware. The present disclosure may take the form of a computer program product implemented on one or more computer-usable storage media (including, but not limited to, a magnetic disk storage, CD-ROM, optical storage and the like) including computer-usable program codes.

The present disclosure is described with reference to flow charts and/or block diagrams of methods, devices (systems), and computer program products in accordance with the embodiments of the present disclosure. It should be understood that, each process and/or block of the flow charts and/or block diagrams, and combinations of processes and/or blocks in the flow charts and/or block diagrams, may be implemented by computer program instructions. The computer program instructions may be provided to a processor of a general purpose computer, a special purpose computer, an embedded processor, or other programmable data processing device to produce a machine, such that the instructions executed by the processor of the computer or other programmable data processing device create a means for implementing the functions specified in one or more processes of the flow charts and/or one or more blocks of the block diagrams.

The computer program instructions may also be stored in a computer-readable storage that can direct a computer or other programmable data processing device to function in a particular manner, such that the instructions stored in the computer-readable storage produce an article of manufacture including instruction means which implement the functions specified in one or more processes of the flow charts and/or one or more blocks of the block diagrams.

The computer program instructions may also be loaded onto a computer or other programmable data processing device to cause a series of operational steps to be performed on the computer or other programmable device, to produce a computer implemented process, such that the instructions executed on the computer or other programmable device provide steps for implementing the functions specified in one or more processes of the flow charts and/or one or more blocks of the block diagrams.

Obviously, a person skilled in the art may make further modifications and improvements without departing from the spirit and scope of the present disclosure. In this way, these modifications and improvements are also intended to be encompassed by the disclosure if they fall within the scope of the claims of the present disclosure and equivalents thereof.

What is claimed is:

1. A communication method for a satellite communication system, performed by a terminal, comprising:
   transmitting an access request signal to a network side device through an uplink beam; and
   performing an access and data communication process through a service beam, the service beam being scheduled by the network side device after the access request signal is detected by the network side device;
   wherein the access request signal carries geographical location information and/or beam direction of the terminal;
   wherein,
      there is a mapping relationship between time domain resources or time domain resource sets of the access request signal and geographical location information and/or beam directions of the terminal; and/or
      there is a mapping relationship between frequency domain resources or frequency domain resource sets of the access request signal and geographical location information and/or beam directions of the terminal; and/or
      there is a mapping relationship between code domain resources or code domain resource sets of the access request signal and geographical location information and/or beam directions of the terminal.

2. The communication method according to claim 1, further comprising:
   obtaining configuration information of the uplink beam, the configuration information being notified by the network side device or specified in a protocol; and
   determining a signal format, a transmitting frequency and/or a transmitting time of the access request signal in accordance with the configuration information.

3. The communication method according to claim 1, further comprising:
   determining a frame boundary or a slot boundary based on a global navigation satellite system time, and achieving time synchronization between the terminal and the network side device through uplink timing pre-compensation; and/or
   performing Doppler frequency estimation and frequency compensation in accordance with geographical location information of the terminal and the network side device, as well as ephemeris information.

4. The communication method according to claim 1, wherein the transmitting the access request signal to the network side device through the uplink beam comprises:
   transmitting the access request signal to the network side device through the uplink beam in case that the terminal needs to transmit data; or
   monitoring periodically for a paging message transmitted by the network side device when the terminal is in an inactive state, and transmitting the access request signal to the network side device through the uplink beam in case that a valid paging message is detected; or
   transmitting the access request signal to the network side device through the uplink beam when the terminal is in the inactive state and in case that a geographical location of the terminal is changed; or
   transmitting the access request signal to the network side device through the uplink beam based on a periodic geographical location reporting mechanism when the terminal is in the inactive state.

5. The communication method according to claim 1, wherein the access request signal comprises one or more of a physical random access channel, an uplink reference signal, and an uplink data channel.

6. An access method, performed by a network side device, comprising:
   receiving an access request signal transmitted by a terminal through an uplink beam; and
   scheduling, in case that the access request signal is detected by the network side device, a service beam to perform an access and data communication process with the terminal;
   wherein the access request signal carries geographical location information and/or beam direction of the terminal;
   wherein
      there is a mapping relationship between time domain resources or time domain resource sets of the access request signal and geographical location information and/or beam directions of the terminal; and/or
      there is a mapping relationship between frequency domain resources or frequency domain resource sets of the access request signal and geographical location information and/or beam directions of the terminal; and/or
      there is a mapping relationship between code domain resources or code domain resource sets of the access request signal and geographical location information and/or beam directions of the terminal.

7. The access method according to claim 6, further comprising:
   transmitting configuration information of the uplink beam, the configuration information comprising a signal format, a transmitting frequency and/or a transmitting time of the access request signal.

8. The access method according to claim 6, further comprising:
- determining a beam direction or a geographical region where the terminal is located in accordance with the geographical location information and/or the beam direction of the terminal carried in the access request signal; or
- determining the beam direction or the geographical region where the terminal is located in accordance with a received signal strength of the access request signal; or
- determining the beam direction or the geographical region where the terminal is located by performing polling detection of the access request signal based on different beam directions; or
- determining the beam direction or the geographical region where the terminal is located by performing multistage beam detection on the access request signal; or
- determining the beam direction or the geographical region where the terminal is located by performing baseband access beam matching detection on the access request signal.

9. A terminal comprising: a first processor, a first transceiver, and a first memory;
- wherein the first transceiver is configured to receive and transmit data under the control of the first processor; and
- the first processor is configured to read a program in the first memory to execute the following operations: transmitting an access request signal to a network side device through an uplink beam; and performing an access and data communication process through a service beam, the service beam being scheduled by the network side device after the access request signal is detected by the network side device;
- wherein the access request signal carries geographical location information and/or beam direction of the terminal;
- wherein
  - there is a mapping relationship between time domain resources or time domain resource sets of the access request signal and geographical location information and/or beam directions of the terminal; and/or
  - there is a mapping relationship between frequency domain resources or frequency domain resource sets of the access request signal and geographical location information and/or beam directions of the terminal; and/or
  - there is a mapping relationship between code domain resources or code domain resource sets of the access request signal and geographical location information and/or beam directions of the terminal.

10. A network side device, comprising: a second processor, a second transceiver and a second memory;
- wherein the second transceiver is configured to receive and transmit data under the control of the second processor; and
- the second processor is configured to read a program in the second memory to implement steps of the method according to claim 6.

11. A non-transitory readable storage medium storing a computer program, wherein the computer program is configured to be executed by a processor to implement steps of the method according to claim 1.

12. A non-transitory readable storage medium storing a computer program, wherein the computer program is configured to be executed by a processor to implement steps of the method according to claim 6.

13. The terminal according to claim 9, wherein the first processor is configured to read the program in the first memory to further execute the following operations:
- obtaining configuration information of the uplink beam, the configuration information being notified by the network side device or specified in a protocol; and
- determining a signal format, a transmitting frequency and/or a transmitting time of the access request signal in accordance with the configuration information.

14. The terminal according to claim 9, wherein the first processor is configured to read the program in the first memory to further execute the following operations:
- determining a frame boundary or a slot boundary based on a global navigation satellite system time, and achieving time synchronization between the terminal and the network side device through uplink timing pre-compensation; and/or
- performing Doppler frequency estimation and frequency compensation in accordance with geographical location information of the terminal and the network side device, as well as ephemeris information.

15. The terminal according to claim 9, wherein the transmitting the access request signal to the network side device through the uplink beam comprises:
- transmitting the access request signal to the network side device through the uplink beam in case that the terminal needs to transmit data; or
- monitoring periodically for a paging message transmitted by the network side device when the terminal is in an inactive state, and transmitting the access request signal to the network side device through the uplink beam in case that a valid paging message is detected; or
- transmitting the access request signal to the network side device through the uplink beam when the terminal is in the inactive state and in case that a geographical location of the terminal is changed; or
- transmitting the access request signal to the network side device through the uplink beam based on a periodic geographical location reporting mechanism when the terminal is in the inactive state.

\* \* \* \* \*